United States Patent [19]

Powell et al.

[11] Patent Number: 5,280,050
[45] Date of Patent: Jan. 18, 1994

[54] COLOR-STABLE POLYCARBONATE COMPOSITION RESISTANT TO GAMMA-RADIATION

[75] Inventors: Douglas G. Powell, Coraopolis; Sivaram Kirshnan, Pittsburgh, both of Pa.

[73] Assignee: Miles Inc., Pittsburgh, Pa.

[21] Appl. No.: 885,336

[22] Filed: May 19, 1992

Related U.S. Application Data

[63] Continuation of Ser. No. 718,064, Jun. 20, 1991, abandoned.

[51] Int. Cl.$^5$ .......................... C08K 5/02; C08K 5/09; C08K 5/10; C08K 5/15
[52] U.S. Cl. ........................ 523/136; 524/94; 524/110; 524/261; 524/288; 524/307; 524/308; 524/316; 524/317; 524/368; 524/378; 524/466; 524/467; 525/462; 525/464
[58] Field of Search ............... 524/243, 262, 288, 316, 524/368, 378, 94, 110, 366, 367, 307, 261, 308, 466, 467; 523/136; 525/464, 462

[56] References Cited

U.S. PATENT DOCUMENTS

| | | | |
|---|---|---|---|
| 3,873,567 | 3/1975 | Cyba | 260/326 |
| 4,552,911 | 11/1985 | Cohnen et al. | 424/94 |
| 4,804,692 | 2/1989 | Lundy et al. | 523/137 |
| 4,874,802 | 10/1989 | Lundy et al. | 524/94 |
| 4,904,710 | 2/1990 | Nace | 523/137 |
| 4,912,158 | 3/1990 | Bohen et al. | 524/288 |
| 5,118,726 | 6/1992 | Mizutani et al. | 524/378 |
| 5,187,211 | 2/1993 | Lundy et al. | 524/378 |

FOREIGN PATENT DOCUMENTS

| | | |
|---|---|---|
| 228525 | 7/1987 | European Pat. Off. . |
| 0359366 | 3/1990 | European Pat. Off. . |
| 0376289 | 4/1990 | European Pat. Off. . |

*Primary Examiner*—Paul R. Michl
*Assistant Examiner*—Tae H. Yoon
*Attorney, Agent, or Firm*—Joseph C. Gil

[57] ABSTRACT

A thermoplastic polycarbonate molding composition which is rendered resistant to deterioration induced by exposure to gamma radiation is disclosed. The composition is imparted an improved degree of color stability upon the incorporation of a minor amount of a poly-(alkylene oxide) oligomer and a halogenated aromatic acid derivative therewith. In addition, the composition is characterized by its low initial color and the small change in its yellowness index after a waiting period of several weeks.

14 Claims, No Drawings

COLOR-STABLE POLYCARBONATE COMPOSITION RESISTANT TO GAMMA-RADIATION

This application is a continuation of copending U.S. application Ser. No. 07/718,064, filed Jun. 20, 1991, now abandoned.

FIELD OF THE INVENTION

The invention relates to thermoplastic molding compositions and more particularly to polycarbonate compositions which are rendered resistant to discoloration induced by gamma radiation.

SUMMARY OF THE INVENTION

The present invention resides in the finding that a thermoplastic polycarbonate molding composition is rendered resistant to discoloration induced by exposure to gamma radiation. The composition is imparted an improved degree of color stability upon the incorporation of a minor amount of a poly(alkylene oxide) oligomer and a halogenated aromatic acid derivative therewith. In addition, the composition is characterized by its low initial color and the small change in its yellowness index after a waiting period of several weeks.

BACKGROUND OF THE INVENTION

Because of their desirable profile of physical and mechanical properties polycarbonate resins are frequently selected for use in molding articles geared for the medical field. In these application, the resistance of the material to deterioration induced by exposure to sterilizing radiation is often times of prime importance. Articles molded from polycarbonate while meeting most other criteria, fall short in terms of their resistance to gamma radiation. These articles suffer yellowing due to the decomposition of the resin. U.S. Pat. Nos. 4,996,244; 4,996,245; 4,996,246; and 4,996,247 are considered to disclose relevant technology.

The art is noted to include European Patent Application 376,289 which disclosed a relevant polycarbonate composition containing a blend of a polycarbonate derived from a halogenated bisphenol and a polyalkylene glycol or its ether, silyl ether or ester. Also relevant is European Patent Application 359,366 which disclosed relevant gamma radiation resistant polycarbonate compositions which contain an organic halogen compound. Of particular importance in the present context are U.S. Pat. Nos. 4,874,802; 4,904,710 and 4,804,692 which disclosed relevant polycarbonate compositions containing polyether compounds including the stabilizing polyalkylene oxide of the present invention.

While the technical solutions offered to date do in fact reduce the permanent yellowing of polycarbonate compositions and impart desirable stability to the articles molded therefrom, a temporary color change characterizes these compositions. This color may take as long as several weeks to subside, especially in the absence of light. This causes undesirable color changes in tinted or dyed polycarbonate resin. In addition, the long period needed to stabilize the color constrains the producers of sterilized parts because of the long delay before a stable, desirable color is attained.

DETAILED DESCRIPTION OF THE INVENTION

Aromatic polycarbonates within the scope of the present invention are homopolycarbonates and copolycarbonates and mixtures thereof.

The polycarbonates generally have a weight average molecular weight of 10,000-200,000, preferably 20,000-80,000 and their melt flow rate, per ASTM D-1238 at 300° C., is about 1 to about 65 gm/10 min., preferably about 2-15 gm/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the invention conform to the structural formulae (1) or (2).

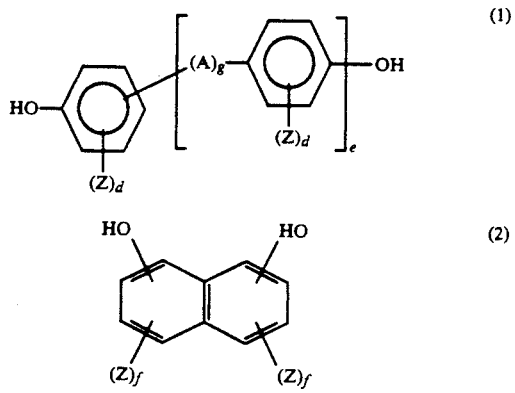

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$— or a radical conforming to

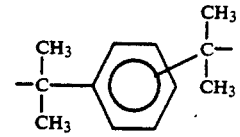

e and g both denote the number 0 to 1;

Z denotes F, Cl, Br or C$_1$-C$_4$-alkyl and if several Z radicals are substituents in one aryl radical, they may be identical or different from one another;

d denotes an integer of from 0 to 4; and f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, and α,α-bis(hydroxyphenyl)-diisopropyl-benzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference.

Further examples of suitable bisphenols are 2,2-bis-(4-hydroxy-phenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, hydroxy-benzophenone, 2,4-bis-(3,5-dimethyl-4-hydroxyphenyl)-cyclo-hexane, α,α'-bis-(3,5-dimethyl-4-hydroxyphenyl)-p-diisopropylbenzene and 4,4'-sulfonyl diphenol.

Examples of particularly preferred aromatic bisphenols are 2,2,-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05-2.0 mol % (relative to the bisphenols) of polyhydroxyl compound. Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methyl-benzyl)-4-methylphenol; 2,4-dihydroxybenzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxybenzoic acid, trimesic acid, cyanuric chloride and 3,3-bis-(4-hydroxyphenyl)2-oxo-2,3-dihydroindole.

In addition to the polycondensation process mentioned above, other process for the preparation of the polycarbonates of the invention are polycondensation in a homogeneous phase and transesterification. The suitable processes are disclosed in the incorporated herein by references, U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, MAKROLON FCR, MAKROLON 2600, MAKROLON 2800 and MAKROLON 3100, all of which are bisphenol based homopolycarbonate resins differing in terms of their respective molecular weights and characterized in that their melt flow indices (MFR) per ASTM D-1238 are about 16.5-24, 13-16, 7.5-13.0 and 3.5-6.5 gm/10 min., respectively. These are products of Mobay Corporation of Pittsburgh, Pa.

A polycarbonate resin suitable in the practice of the invention is known and its structure and methods of preparation have been disclosed, for example in U.S. Pat. Nos. 3,030,331; 3,169,121; 3,395,119; 3,729,447; 4,255,556; 4,260,731; 4,369,303 and 4,714,746 all of which are incorporated by reference herein.

The halogenated aromatic acid derivative suitable in the context of the invention is a compound conforming to

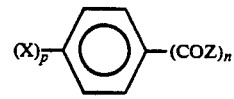

where X denotes chlorine or bromine atom, p is an integer of from 1 to 5, n is an integer from 1 to 4 and Z is an oxygen atom, a $C_{1-22}$ alkoxy, cycloalkoxy, aroxy, alkyl-aroxy or cycloalkyl-aryoxy radical, an amido, alkylamido, or aryl-amido radical. Optionally, Z may be substituted by at least one member selected from the group consisting of S,O,Cl and Br atoms.

In a preferred embodiment, the halogenated aromatic acid derivative conforms to

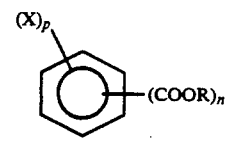

where X is a chlorine or bromine atom, n is an integer of 1 to 4, p is an integer of 1 to 5, and R is a $C_{1-22}$ alkyl, cycloalkyl, aryl, alkyl-aryl or cycloalkyl-aryl radical. Optionally, R may be substituted by at least one member selected from the group consisting of S,O,Cl and Br atoms.

A more preferred embodiment entails a halogenated phthalic acid ester, most preferably tetrabromphthalate.

The halogenated aromatic acid derivative of the invention may be prepared by conventional procedures well known in the art.

Examples of halogenated aromatic acid derivatives are described in U.S. Pat. Nos. 4,098,704; 4,298,517; 4,397,977, 4,904,795; incorporated herein by reference.

Suitable halogenated aromatic acid derivatives including the preferred tetrabromophthalate, are available in commerce.

The poly(alkylene oxide) oligomer of the invention conforms structurally to

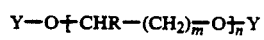

Preferably, the oligomer conforms to

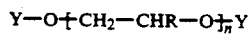

where Y denotes a hydrogen atom, a $C_{1-30}$ linear or branched alkyl or acyl radicals, a silyl or a pyranyl radical, R is a $C_{1-22}$ alkyl, cycloalkyl, aryl, alkylaryl or cycloalkyl-aryl radicals, m is an integer from 1 to 4, and n is an integer of 1 to 70, preferably 30 to 50 and more preferably about 35 to 40.

The composition of the invention contains both the halogenated aromatic acid derivative and the poly(alkylene oxide) oligomer. These components are introduced to the polycarbonate resin at sufficient amounts to stabilize the composition against increase in yellowness upon exposure to gamma radiation. More preferably, the relative amounts of these additive components is about 0.1 to about 10%, more preferably 0.2 to 5.0%, of the halogenated aromatic acid derivative, and 0.1 to 5%, more preferably 0.5 to 1.0% of the poly(alkylene oxide) oligomer, said percents being relative to the weight of the composition. The incorporation of the components to the composition and the processing of the inventive composition are carried out following conventional procedures which are well known in the art.

EXPERIMENTAL

Compositions within the scope of the invention have been prepared and their properties evaluated. The results of the evaluation are summarized below. In demonstrating the invention, the compositions were based on MAKROLON 2508, polycarbonate resin, a bisphenol-A based homopolycarbonate having a Melt flow index-as determined in accordance with ASTM D 1238 of about 16 gm/10 minutes, a product of Mobay Corporation. The polyether was an oligomer of propylene glycol conforming structurally to

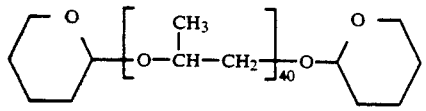

The halogenated aromatic acid derivative was di-2-ethylhexyl tetrabromophthalate (TBPH), available commercially as PYRONIL 45, a product of Penwalt Corporation, King of Prussia, Pa.

The compositions were processed conventionally following procedures known in the art. After tumble blending the compositions were pelletized on a ZSK twin screw extruder where the temperatures profile was 190°, 240°, 270°, 270°, 270° and 270° C.; Screw speed 300 rpm. Color chips measuring 2.0"×3.0"×0.100" were injection molded using a typical molding machine with a resin melt temperature of between 540° and 600° F. The chips were subjected to gamma radiation at a dose of 2.5 Mrad. The irradiated chips were stored in darkness. At intervals, the yellowness indices of the chips were measured in accordance with ASTM D 1925. The results are shown in the table below.

TABLE 1

| Components, wt. % | 1 | 2 | 3 | 4 |
|---|---|---|---|---|
| Polycarbonate, | 100 | 99.0 | 99.5 | 99.5 |
| Propylene glycol oligomer | 0.0 | 0.5 | 0.0 | 0.5 |
| TBPH | 0.0 | 0.5 | 0.5 | 0.0 |
| Yellowness Index | | | | |
| Pre-irradiation | 4.81 | 3.63 | 3.88 | 4.17 |

TABLE 1-continued

| Components, wt. % | 1 | 2 | 3 | 4 |
|---|---|---|---|---|
| 6 days after irradiation | 21.8 | 11.74 | 15.56 | 15.58 |
| 9 days after irradiation | 17.65 | 11.32 | 15.01 | 13.75 |
| 29 days after irradiation | 16.64 | 10.94 | 13.89 | 17.3 |
| 35 days after irradiation | 16.89 | 10.87 | 13.68 | 12.6 |
| 55 days after irradiation | 17.28 | 10.59 | 13.5 | 12.21 |
| Delta Yellowness Index (from 6 to 55 days after irradiation) | 4.52 | 1.15 | 2.06 | 3.37 |

The yellowness index measurements show that the polyether and the brominated phthalate ester are nearly equivalent in terms of their efficacy in imparting gama stability to the composition. The color however continues to change significantly over several weeks. The composition in accordance with the invention-Example 2-shows both lower initial color and smaller change-as reflected by the delta yellowness index-during the same period.

In an additional set of experiments, the results of which are shown below, the synergy associated with the present invention is clearly demonstrated.

TABLE 2

| Components, wt. % | 5 | 6 | 7 | 8 |
|---|---|---|---|---|
| Polycarbonate, | 100 | 99.25 | 99.25 | 99.25 |
| Propylene glycol oligomer | 0.0 | 0.37 | 0.74 | 0.0 |
| TBPH | 0.0 | 0.37 | 0.0 | 0.74 |
| Yellowness Index | | | | |
| Pre-irradiation | 3.57 | 2.58 | 2.14 | 3.30 |
| 12 days after irradiation | 21.59 | 10.95 | 12.88 | 12.97 |
| 25 days after irradiation | 19.48 | 10.61 | 12.23 | 12.71 |
| 56 days after irradiation | 18.35 | 10.49 | 11.96 | 12.43 |
| Delta Yellowness Index (from 12 to 56 days after irradiation) | 3.24 | 0.46 | 0.92 | 0.54 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising an aromatic polycarbonate resin prepared from at least one dihydroxy compound conforming only to

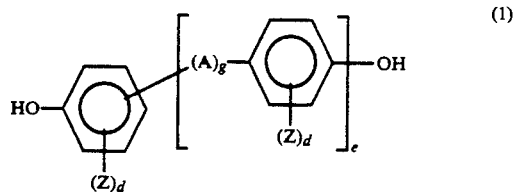

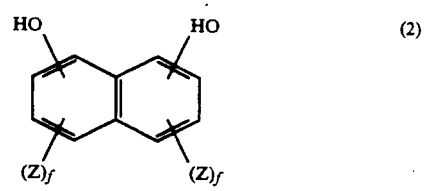

wherein

A denotes an alkylene group with 1 to 8 carbon atoms, an alkylidene group with 2 to 8 carbon atoms, a cycloalkylene group with 5 to 15 carbon atoms, a cycloalkyklidene group with 5 to 15 carbon atoms, a carbonyl group, an oxygen atom, a sulfur atom, —SO— or —SO₂— or a radical conforming to

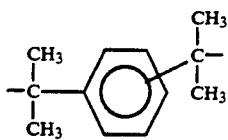

e and g both denote the number 0 to 1;
Z denotes C₁₋₄-alkyl and if several Z radicals are substituents in one aryl radical, they may be identical or different from one another;
d denotes an integer of from 0 to 4; and
f denotes an integer of from 0 to 3; and minor amounts of
(i) a halogenated aromatic acid derivative conforming to

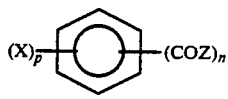

wherein X denotes chlorine or bromine, p is an integer of from 1 to 5, n is an integer from 1 to 4 and Z is an oxygen atom, a C₁₋₂₂-alkoxy, cycloalkoxy, aroxy, alkyl-aroxy or cycloalkyl-aroxy radical, an amido, alkylamido, or aryl-amide radical,
and
(ii) a poly(alkylene oxide) oligomer conforming to

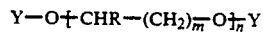

where
Y denotes a C₁₋₃₀ linear or branched alkyl or acyl radicals, or a pyranyl radical,
R is a C₁₋₂₂ alkyl, cycloalkyl, aryl, alkylaryl or cycloalkyl-aryl radicals, and
m is an integer of from 1 to 4, and
n is an integer of 1 to 70,
said minor amounts being sufficient to substantially stabilize the polycarbonate resin against yellowness induced by exposure to gamma radiation.

2. The composition of claim 1 wherein said aromatic acid derivative is a halogenated aromatic acid ester conforming to:

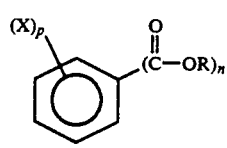

where X denotes chlorine or bromine atom, p is an integer from 1 to 5; n is an integer from 1 to 4, and R is a C₁₋₂₂ alkyl, cycloalkyl, aryl, alkylaryl or cycloalkyl-aryl radical.

3. The composition of claim 1 wherein said oligomer conforms to

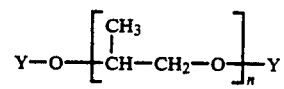

where Y denotes, a C₁₋₃₀ linear or branched alkyl or acyl radicals, or a pyranyl radical, and n is an integer of 1 to 70.

4. The composition of claim 1 wherein said n is 1 to 30.

5. The composition of claim 1 wherein said n is 1 to 5.

6. The composition of claim 5 wherein said aromatic acid derivative is a tetrabromophthalate ester.

7. The composition of claim 1 wherein said (i) is present in an amount of about 0.1 to 10% and said (ii) is present in an amount of about 0.1 to 5.0% relative to the weight of the composition.

8. The composition of claim 1 wherein said (i) is present in an amount of about 0.2 to 1.0% and said (ii) is present in an amount of about 0.5 to 1.0% relative to the weight of the composition.

9. The composition of claim 8 wherein said (ii) is poly(propylene oxide).

10. The composition of claim 9 wherein said (i) is tetrabromophthalate ester.

11. A thermoplastic molding composition comprising an aromatic polycarbonate resin and minor amounts of
(i) a halogenated aromatic acid derivative conforming to

X denotes chlorine or bromine atom, p is an integer of from 1 to 5, n is an integer from 1 to 4 and Z is an oxygen atom, a C₁₋₂₂ alkoxy, cycloalkoxy, aroxy, alkyl-aroxy or cycloalkyl-aryloxy radical, an amido, alkylamido or aryl-amido radical
and
(ii) a poly(alkylene oxide) oligomer conforming to

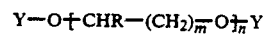

where Y denotes a pyranyl radical, R is a C₁₋₂₂ alkyl, cycloalkyl, aryl, alkylaryl or cycloalkyl-aryl radicals and m is an integer of from 1 to 4, and n is an integer of 1 to 70, said minor amounts being sufficient to substantially stabilize the polycarbonate resin against yellowness induced by exposure to gamma radiation.

12. The composition of claim 11 wherein said oligomer conforms to

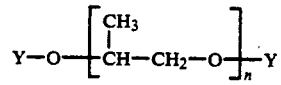

where Y denotes a pyranyl radical.

13. The composition of claim 11 wherein n is 1 to 5 and wherein said aromatic acid derivative is a tetrabromophthalate ester.

14. The composition of claim 11 wherein said (i) is tetrabromophthalate ester, and is present in an amount of about 0.2 to 1.0% and said (ii) is present in an amount of 0.5 to 1.0% relative to the weight of the composition.

* * * * *

UNITED STATES PATENT AND TRADEMARK OFFICE
CERTIFICATE OF CORRECTION

PATENT NO. : 5,280,050
DATED : January 18, 1994
INVENTOR(S) : Douglas G. Powell et al It is certified that error appears in the above-identified patent and that said Letters Patent is hereby corrected as shown below:

On the title page: [75] Inventors:
Under "Inventors", correct "Sivaram Kirshnan" to --Sivaram Krishnan--.

At column 3, line 57, correct "process" to --processes--.
At column 4, line 52, correct""tetrabromphthalate" to
--tetrabromophthalate--.
At column 6, line 13, correct "gama" to --gamma--.

Signed and Sealed this

Twenty-fourth Day of May, 1994

Attest:

BRUCE LEHMAN

Attesting Officer

Commissioner of Patents and Trademarks